United States Patent Office 3,417,102
Patented Dec. 17, 1968

3,417,102
OXETANE COMPOUNDS
Robert A. Braun, Newark, Del., assignor to E. I. du Pont de Nemours and Company, Wilmington, Del., a corporation of Delaware
No Drawing. Filed May 19, 1965, Ser. No. 457,210
12 Claims. (Cl. 260—333)

ABSTRACT OF THE DISCLOSURE

Oxetane compounds having the general structural formula:

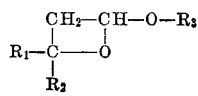

in which $R_1$ and $R_2$ are $C_1$ to $C_5$ perfluoroalkyl, chlorodifluoromethyl or fluorodichloromethyl radicals; $R_3$ is a $C_1$ to $C_6$ alkyl substituted with one cyano, $C_1$ to $C_5$ alkoxy, acrylyloxy, or methacrylyloxy radical; $C_2$ to $C_5$ alkenyl; $C_2$ to $C_5$ alkenyl substituted with one cyano or $C_1$ to $C_5$ alkoxy radical; or has the structural formula:

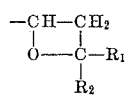

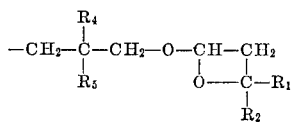

or

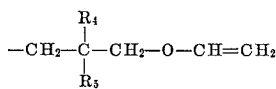

in which $R_4$ and $R_5$ are $C_1$ to $C_5$ alkyl, $C_2$ to $C_5$ alkenyl or radicals having the structural formulas:

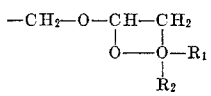

or

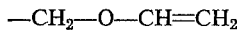

are provided for use as flame resistant liquids, films and coatings.

This invention concerns new chemical compounds, especially new oxetanes. The compounds of this invention have the structural formula:

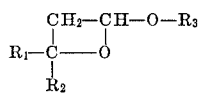

in which $R_1$ and $R_2$ are $C_1$ to $C_5$ perfluoroalkyl, chlorodifluoromethyl, or fluorodichloromethyl radicals; $R_3$ is a $C_1$ to $C_{10}$ alkyl substituted with one cyano, $C_1$ to $C_5$ alkoxy, acrylyloxy, or methacrylyloxy radical; $C_2$ to $C_5$ alkenyl; $C_2$ to $C_5$ alkenyl substituted with one cyano or $C_1$ to $C_5$ alkoxy radical; or has the structural formula:

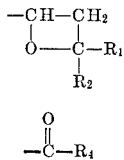

or

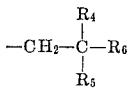

in which $R_1$ and $R_2$ have the above designations, $R_4$ and $R_5$ are $C_1$ to $C_5$ alkyl, $C_2$ to $C_5$ alkenyl or radicals having the structural formulas:

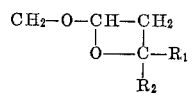

or

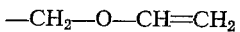

and $R_6$ is a radical having the structural formula:

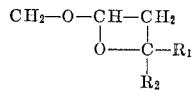

or

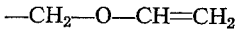

Compounds of this invention are prepared by a reaction represented as follows:

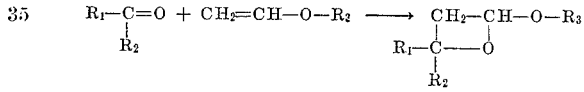

where $R_1$, $R_2$ and $R_3$ have the above designations. This reaction usually takes place at temperatures between about $-20°$ C. to $+50°$ C. but in some cases temperatures over $150°$ C. are employed. A solvent for at least one of the reactants such as ethyl ether, petroleum ether or benzene, is used as a reaction medium and the other reactant is slowly admixed, usually over a period of about one hour, with continuous stirring. An inert atmosphere such as nitrogen is desirable to prevent hydration of the ketone. After mixing is complete, stirring is continued for at least another hour for maximum efficiency. Yields of this reaction range as high as about 93%. When one of the reactants is a gas at reaction temperature, mixing can be conducted by bubbling this gaseous reactant through the other reactant or a solution of the other reactant.

All of the compounds of this invention are flame resistant liquids extremely immiscible with water. Compounds in which $R_1$ and $R_2$ are perfluoroalkyl tend to be most flame resistant. Those compounds having a single oxetane ring are generally useful as selective flame resistant solvents for hydrocarbons used and produced in the petroleum refining industry. Compounds having multiple oxetane rings or vinyl ether groups polymerize by ring opening or addition polymerization respectively to water insoluble polymers capable of forming flame resistant protective films and coatings.

Ketones useful as one of the reactants in making compounds of this invention include hexafluoroacetone, perfluoro-2-butanone, perfluoro-2-pentanone, perfluoro-3-pentanone, perfluoro-2-hexanone, perfluoro-3-hexanone, perfluoro-2-heptanone, perfluoro-3-heptanone, perfluoro-4-heptanone, perfluoro-3-octanone, perfluoro-4-octanone, perfluoro-4-nonanone, perfluoro-6-hendecanone, chloropentafluoroacetone, 1,1-dichloro-tetrafluoro-2-propanone, 1,3-dichlorotetrafluoro-2-propanone, 1,1,3-trichloro-trifluoro-2-propanone and 1,3-difluoro-tetrachloro-2-propanone.

Vinyl ethers useful as the other reactant are readily derived from the list of specific R₃ radicals presented below. For example, vinyl ether reacts to form a compound in which R₃ is vinyl, cyanomethyl vinyl ether forms a compound in which R₃ is cyanomethyl, etc.

Compounds of this invention are separated by stripping the reaction product mixture at a temperature of about 0 to 40° C. to vaporize the more volatile reactants and solvent. A partial vacuum is usually utilized in this stripping operation. Compounds of this invention are removed from the residue of this stripping operation by fractionation, usually under low absolute pressure. Purity of the compounds of this invention resulting from fractionation is as high as 99%.

Typical specific compounds of this invention along with their structural formulas are:

I 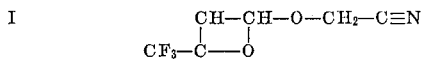

4-cyanomethoxy-2,2-bis(trifluoromethyl)oxetane

II 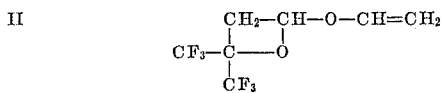

4-vinyloxy-2,2-bis(trifluoromethyl)oxetane

III 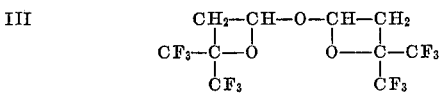

2,2-bis(trifluoromethyl-4-oxetanyl ether)

IV 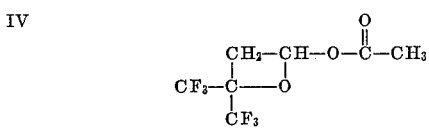

4-formyloxy-2,2-bis(trifluoromethyl)oxetane

V 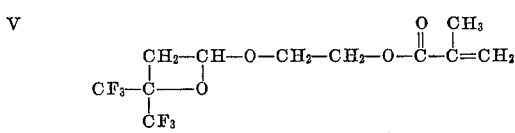

4-methacrylylethylenedioxy-2,2-bis(trifluoromethyl)oxetane

VI 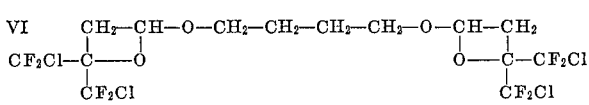

1,4-bis[2',2'-bis(chlorodifluoromethyl)-4' - oxetanyloxy]butane

VII 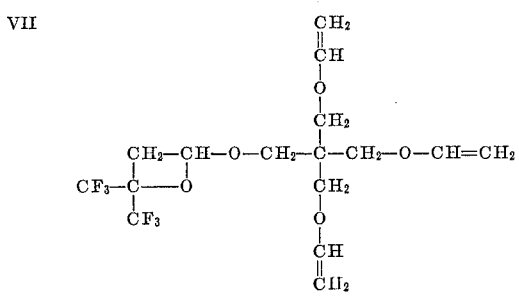

4-[2',2',2'-tris(vinyloxymethyl)ethoxy]-2,2 - bis(trifluoromethyl)oxetane

VIII 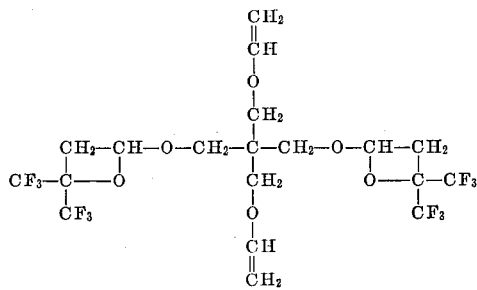

2,4 - bis[vinyloxy]-1,3-bis[2',2' - bis(trifluoromethyl)-4'-oxetanyloxy]neopentane IX 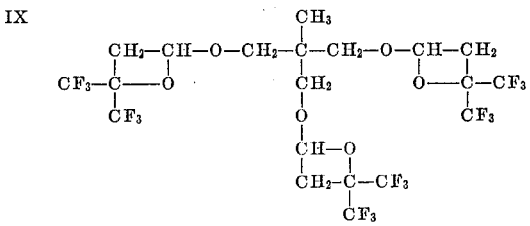

1',2',3'-tris[2,2-bis(trifluoromethyl)-4 - oxetanyloxy]neopentane

X 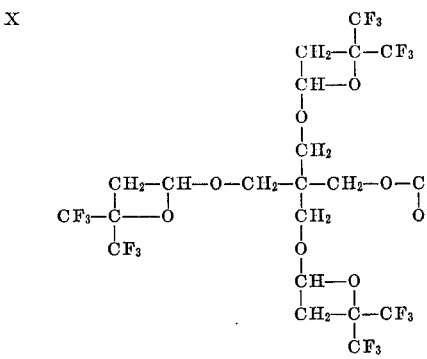

tetrakis-[2,2-bis(trifluoromethyl)-4 - oxetanyloxymethyl] methane

XI 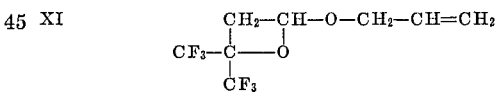

4-allyloxy-2,2-bis(trifluoromethyl)oxetane

Compounds characterized by structural Formulas I and IV are miscible with most aromatic hydrocarbons but immiscible with most aliphatic hydrocarbons and are useful as selective solvents in the processing of petroleum distillates. Compounds of this invention which have one or more vinyl ether groups (e.g., compounds characterized by structural Formulas II, VII and VIII) homopolymerize in the presence of Friedel-Crafts type cationic catalysts such as boron trifluoride, aluminum chloride, titanium tetrachloride, and stannic chloride or by photoinitiation to form clear, tough films and protective coatings. Compounds of this invention containing acrylic or allylic groups (e.g., compounds characterized by structural Formulas V and XI, respectively) can be homopolymerized or copolymerized with acrylates and methacrylates using free radical catalysts such as benzoyl peroxide, di-tert.-butyl peroxide, or azoisobutyronitrile to form tough, insoluble films and coatings.

Compounds of this invention containing two or more 2,2 - bis(perhaloalkyl)oxetanyl groups (e.g., compounds characterized by structural Formulas III, VI, VIII, IX and X) homopolymerize to viscous liquids, solids, films or coatings using cationic catalysts such as boron trifluoride.

Specific C₁ to C₅ perfluoroalkyls useful as the R₁ and/or R₂ radicals in compounds of this invention are perfluoromethyl, perfluoroethyl, perfluoropropyl, perfluorobutyl, or perfluoropentyl radicals.

Specific $R_3$ radicals useful in compounds of this invention include cyanomethyl (structural Formula I above), methacrylylethylenedioxy (structural Formula V), cyanoethyl, cyanopropyl, cyanopentyl, methoxypentyl, 1-methoxy-1-ethylpentyl, ethenyl structural Formula II), 1-propenyl, 2-propenyl (structural Formula XI), 3 - cyano - 2 - propenyl, 3-methoxy-2-propenyl, 1-butenyl, 2-butenyl, 3-butenyl, 1-pentyl, 4-pentyl, methoxymethyl, ethoxymethyl, etc. Specific $R_3$ radicals having the structural formula

included formyl (structural Formula IV), acetyl, cyanoacetyl, propionyl, n-butyryl, valeryl, etc.

Specific radicals having the structural formula:

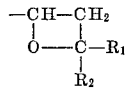

which are useful as $R_3$ radicals in compounds of this invention are 4,4-bis(perfluoromethyl) - 2 - oxetanyl (structural Formula III above); 4,4-bis(chlorodifluoromethyl)-2 - oxetanyl; 4,4 - bis(fluorodichloromethyl)-2-oxetanyl; 4,4 - bis(perfluoroethyl)-2-oxetanyl; 4,4-bis(perfluoropropyl) - 2 - oxetanyl; 4-perfluoromethyl-4-perfluoroethyl-2-oxetanyl; 4 - perfluoroethyl-4-perfluoropropyl-2-oxetanyl; 4-perfluoromethyl-4-perfluoropentyl-2-oxetanyl; etc.

Compounds of this invention in which $R_3$ has the formula:

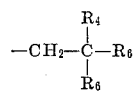

are easily polymerized to form clear films and coatings. By baking these films and coatings at about 100° C. crosslinking which renders the polymers insoluble in organic solvents is effected. Specific $R_3$ radicals having this structural formula include 2,2-dimethyl-4-oxa-5-hexenyl, 2,2-di(ethenyloxymethyl)propyl etc.

The following examples further illustrate preparation and use of compounds of this invention.

EXAMPLE 1

During a period of about 1 hour, about 83 grams of hexafluoroacetone is bubbled into a solution of 78 grams of vinyloxyethyl methacrylate in 100 milliliters of ethyl ether at a temperature between 0 to —10° C. with stirring. Stirring is continued after this addition for two hours at 0 to —20° C. The reaction which takes place is represented by

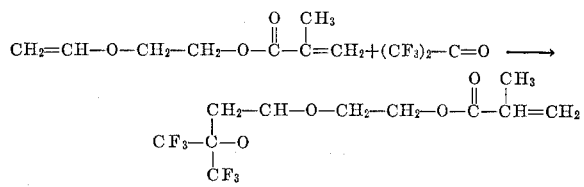

The resulting solution is stripped of volatiles at 25° C. under an absolute pressure of 10 millimeters of mercury. About 150 grams (93% yield) of clear liquid product results.

This liquid is purified in a spinning band distillation column under an absolute pressure of about 1.75 millimeters of mercury. A fraction of about 140 grams of pure 2 - methacrylylethylenedioxy - 4,4 - bis(trifluoromethyl) oxetane is drawn from the column at a boiling temperature of about 82° C. Refractive index $n_D^{25}$ of this fraction is about 1.3896.

This oxetane homopolymerizes in the presence of benzoyl peroxide forming a polymer which is insoluble in boiling benzene or N,N′-dimethylformamide. Homopolymerization of this oxetane is also catalyzed by boron trifluoride etherate and by cationic photoinitiation. Copolymerization of the oxetane with methyl methacrylate can be initiated by azodiisobutyronitrile.

EXAMPLE 2

During a period of about one hour, about 66.5 grams of hexafluoroacetone is bubbled into a solution of 32 grams of allyl vinyl ether in 100 milliliters of anhydrous ethyl ether at a temperature between 0 and —10° C. with stirring. Stirring is continued for about an hour at 0° C. The resulting solution is stripped of volatiles at 25° C. under an absolute pressure of 10 millimeters of mercury to provide about 84 grams of a colorless liquid.

This colorless liquid is fractionated in the spinning band distillation column used in Example 1 under an absolute pressure of about 14 millimeters of mercury. A fraction of about 79 grams of 2-allyloxy-4,4-bis(trifluoromethyl) oxetane boiling at 45° C. is formed. This oxetane has a refractive index $n_D^{25}$ of 1.3512.

EXAMPLE 3

Vinyl ether (21 grams) and hexafluoroacetone (110 grams) are heated in a stainless steel bomb for two hours at 50° C., two hours at 100° C., and two hours at 150° C. The bomb is rocked gently during heating. The resulting product is fractionated under a pressure of 20 millimeters of mercury in the distillation column used in Example 1 to give about 54.8 grams of a fraction boiling at about 33° C. This fraction has a refractive index $n_D^{25}$ of 1.3275, a melting point below —30° C., and a boiling point of 179° C. at 760 millimeters of mercury and is identified as di - 2 - [4,4-bis(trifluoromethyl)oxetanyl]ether. Coatings and fibers having good weatherability can be prepared by homopolymerizing this ether using boron trifluoride etherate.

EXAMPLE 4

Cyanomethyl vinyl ether (22.2 grams) and hexafluoroacetone (45 grams) are heated to 150° C. in a stainless steel bomb for 6 hours. The bomb is rocked gently during heating. Fractionation of the resulting clear brown liquid in the distillation column used in Example 1 under a pressure of about 0.4 millimeter of mercury gives about 58.2 grams of a fraction boiling at about 40–41° C. This fraction has a refractive index $n_D^{25}$ of 1.3551, a melting point of +6 to +7° C., and a boiling point of 197° C. at 760 millimeters of mercury. This fraction is identified as 2-cyanomethoxy-4,4-bis(trifluoromethyl)oxetane.

This oxetane is especially useful as a selective solvent for hydrocarbons. For example, compounds such as petroleum ether, pentane, n-hexane, n-heptane, n-octane, water, Decalin, cyclohexane, cyclohexene, cyclooctene, 1,3-cyclooctadiene and 1,5-cyclooctadiene are very insoluble while compounds such as benzene, toluene, xylene, hexamethyl phosphoramide, ethyl benzene, cumene, tetralin, and nitromethane are very soluble in this oxetane.

EXAMPLE 5

During a period of about 1 hour, about 25 grams of hexafluoroacetone is bubbled into a solution of 17 grams of tetravinyl pentaerythritol in about 80 milliliters of benzene at a temperature between 0 to —5° C. with stirring. Stirring is continued after this addition for about 2 hours at room temperature. A vacuum is used to strip the resulting mixture of volatiles. About 39.6 grams of a clear, slightly viscous liquid identified as 2,4-bis[vinyloxy] - 1,3-bis-[2′,2′-bis(trifluoromethyl)-4′-oxetanyloxy] neopentane results.

This liquid polymerizes rapidly in the presence of a 1% boron trifluoride etherate solution in ethyl ether to form a hard, tough polymer. Polymerization of films of this liquid is effected by contacting the film with an atmosphere of boron trifluoride gas in nitrogen.

EXAMPLE 6

About 93 grams of hexafluoroacetone is heated for 4 hours with a solution of 32.3 grams of tetravinyl pentaerythritol in about 100 milliliters of benzene in a closed 500 milliliter bomb. The bomb is rocked during heating. A vacuum is used to strip the resulting mixture of benzene. A viscous liquid consisting essentially of tetrakis-[2,2-bis-(trifluoromethyl) - 4 - oxetanyloxymethyl]methane results. This liquid polymerizes at room temperature in the presence of boron trifluoride etherate.

I claim:

1. A compound having the structural formula:

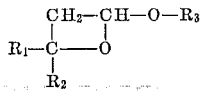

in which $R_1$ and $R_2$ are radicals from the group consisting of $C_1$ to $C_5$ perfluoroalkyl, chlorodifluoromethyl, and fluorodichloromethyl; $R_3$ is a radical from the group consisting of $C_1$ to $C_6$ alkyls substituted with one radical from the group consisting of cyano, $C_1$ to $C_5$ alkoxy, acrylyloxy, and methacrylyloxy; $C_2$ to $C_5$ alkenyls; $C_2$ to $C_5$ alkenyls substituted with one radical from the group consisting of cyano and $C_1$ to $C_5$ alkoxys; and radicals having the structural formulas:

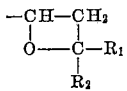

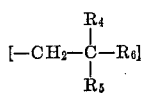

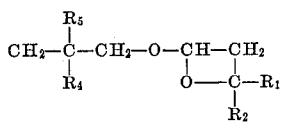

and

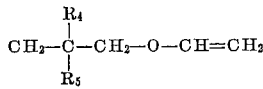

in which $R_1$ and $R_2$ have the above designations, $R_4$ and $R_5$ are from the group consisting of $C_1$ to $C_5$ alkyls, $C_1$ to $C_5$ alkenyls and radicals having the structural formulas:

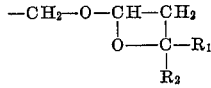

and

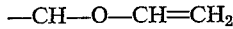

2. A compound of claim 1 in which $R_1$ is a perfluoroalkyl radical.

3. A compound of claim 2 in which $R_2$ is a perfluoroalkyl radical.

4. A compound of claim 3 in which $R_1$ is a trifluoromethyl radical.

5. A compound of claim 4 in which $R_2$ is a trifluoromethyl radical.

6. A compound of claim 5 in which $R_3$ is a $C_2$ to $C_5$ alkenyl radical.

7. A compound of claim 5 in which $R_3$ is a $C_2$ to $C_5$ alkenyl radical substituted with one radical from the group consisting of cyano and $C_1$ to $C_5$ alkoxys.

8. A compound of claim 5 in which $R_3$ is selected from the group consisting of:

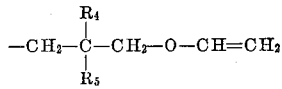

and

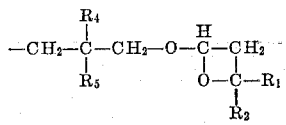

9. A compound of claim 8 in which $R_4$ has the structural formula

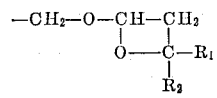

10. A compound of claim 1 in which $R_3$ has the structural formula

11. A compound of claim 1 in which $R_3$ has the structural formula

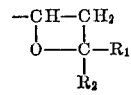

12. A compound of claim 1 in which $R_3$ is selected from the group consisting of:

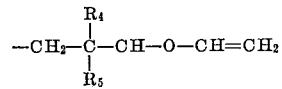

and

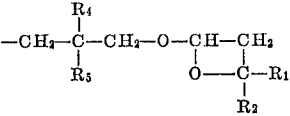

References Cited

UNITED STATES PATENTS

| | | | |
|---|---|---|---|
| 3,096,344 | 7/1963 | Case | 260—333 |
| 3,125,581 | 3/1964 | Coffman et al. | 260—333 |
| 3,164,610 | 1/1965 | Davis | 260—333 |

HENRY R. JILES, *Primary Examiner.*

S. WINTERS, *Assistant Examiner.*

U.S. Cl. X.R.

117—136; 252—8.1; 260—88.3

UNITED STATES PATENT OFFICE
CERTIFICATE OF CORRECTION

Patent No. 3,417,102                                       December 17, 196

Robert A. Braun

It is certified that error appears in the above identified
patent and that said letters Patent are hereby corrected as
shown below:

Column 8, lines 38 to 42, the formula should appear as shown below:

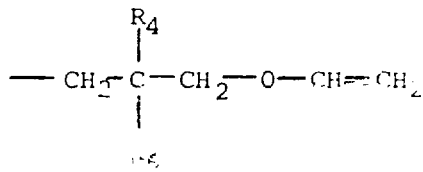

Signed and sealed this 17th day of March 1970.

(SEAL)
Attest:

EDWARD M. FLETCHER, JR.                          WILLIAM E. SCHUYLER, JR
Attesting Officer                                Commissioner of Patents